United States Patent [19]

Savit

[11] Patent Number: 4,589,100
[45] Date of Patent: May 13, 1986

[54] METHOD AND APPARATUS FOR POSITIONING SEISMIC ARRAYS

[75] Inventor: Carl H. Savit, Houston, Tex.

[73] Assignee: Western Geophysical Company of America, Houston, Tex.

[21] Appl. No.: 316,596

[22] Filed: Oct. 30, 1981

[51] Int. Cl.$^4$ .............................................. G01V 1/22
[52] U.S. Cl. ...................................... 367/77; 367/56; 343/357
[58] Field of Search ........................ 367/56, 57, 58, 77, 367/37, 76, 128; 181/109, 112; 343/352, 389, 357

[56] References Cited

U.S. PATENT DOCUMENTS

| | | | |
|---|---|---|---|
| 2,513,314 | 7/1950 | Hawkins | 367/77 |
| 3,941,984 | 3/1976 | Chappell et al. | 343/100 ST |
| 3,946,357 | 3/1976 | Weinstein et al. | 367/77 |
| 4,086,504 | 4/1978 | Ezell et al. | 367/77 |
| 4,152,691 | 5/1979 | Ward | 367/77 |
| 4,310,884 | 1/1982 | Roberts et al. | 343/352 |
| 4,323,990 | 4/1982 | Goode et al. | 367/21 |

OTHER PUBLICATIONS

"Magnavox Announces the MX 1502 Satellite Surveyor", Magnavox Product Information Release, Advanced Product Information–1st Quarter, (1977), Magnavox Advanced Products Division.

*Primary Examiner*—Salvatore Cangialosi
*Assistant Examiner*—Ian J. Lobo
*Attorney, Agent, or Firm*—William A. Knox

[57] ABSTRACT

A seismic data recording system includes a central station and a plurality of remote seismic data recording units that are deployed within a desired region relative to the central station. The differential locations of the remote recording units relative to the central station are determined by receiving and recording electromagnetic positioning signals at the central station. A portion of the electromagnetic positioning signals is concurrently received and recorded at the respective remote recording units. The portion of the positioning signals recorded at each remote recording unit is combined with the recorded positioning signals from the central station to determine the required differential locations.

10 Claims, 4 Drawing Figures

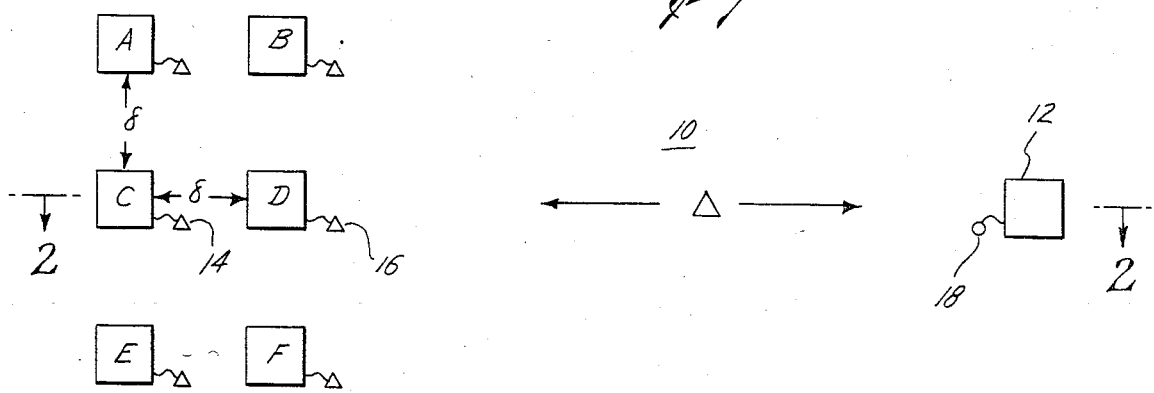
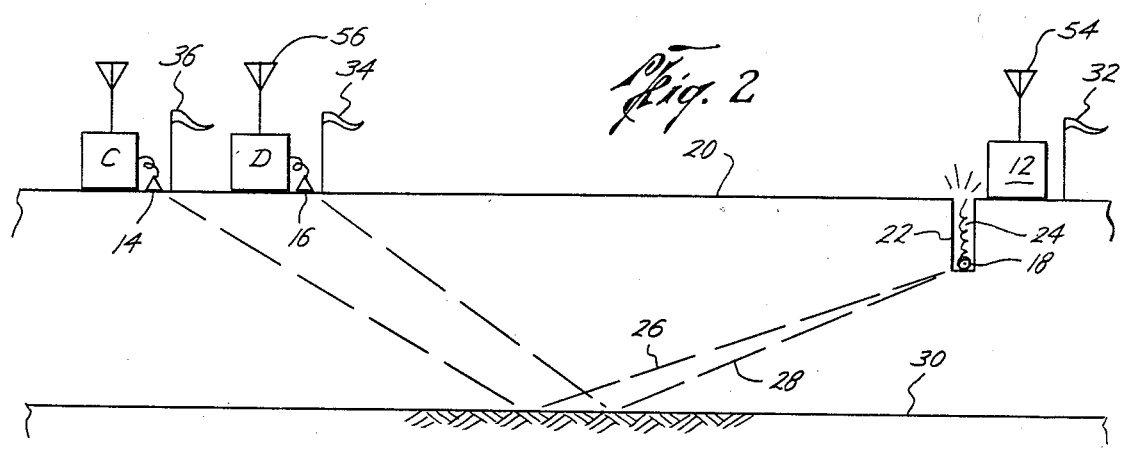
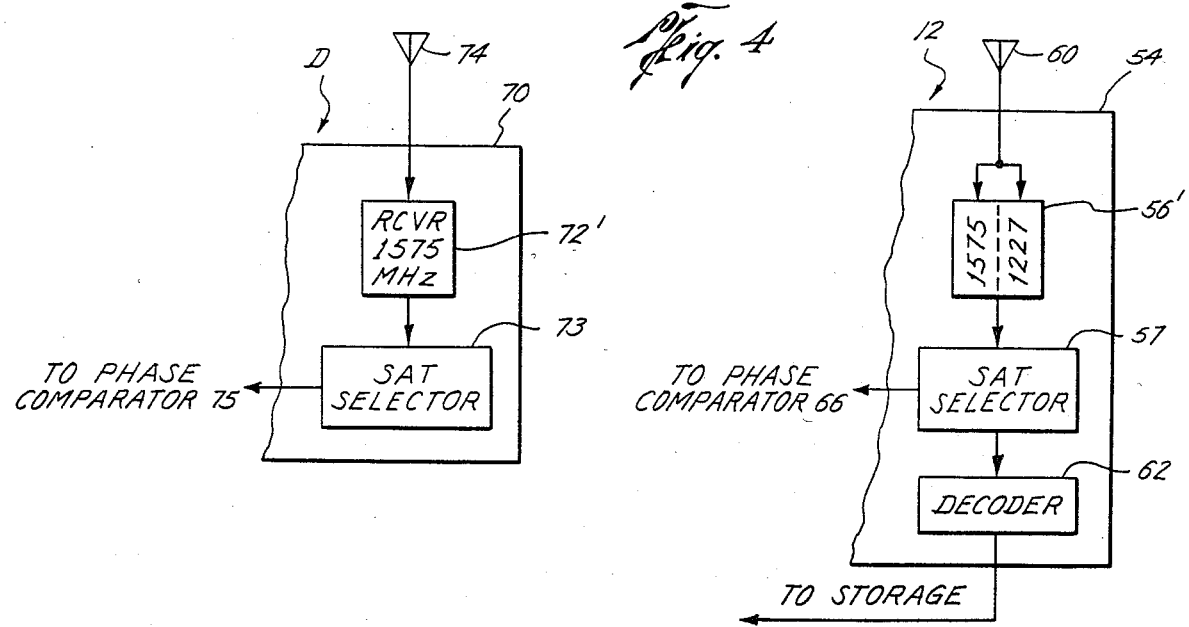

METHOD AND APPARATUS FOR POSITIONING SEISMIC ARRAYS

BACKGROUND OF THE INVENTION

1. Field of the Invention

This invention relates to the relative positioning of independent seismic arrays with respect to a central station by use of relative differences of electromagnetic positioning signals.

2. Discussion of the Prior Art

In modern seismic exploration practice on land, it is customary to employ several hundred to a thousand or more remote seismic sensor arrays, deployed in a predetermined relationship within a desired region, usually within a few kilometers, relative to a central station. Centralized hard-wired systems and radio-controlled systems are known. But in a preferred system, the remote units have no physical or ethereal connection with the central station during a normal recording period. They are completely incommunicado with respect to the central station. For example, see U.S. Pat. No. 4,281,403 assigned to a sister firm of the assignee of this invention. In that patent, a plurality of remote recording units, each having a sensor array coupled thereto are provided. Each remote unit has an internal alarm clock that wakes up the unit for a period of time at programmed intervals, according to the local clock so that the unit can record seismic signals generated by a sound source that is fired at corresponding intervals by the central station according to a master clock.

In the above system, two things are necessary: Each remote unit must have a unique identity and the geographic location of each unit must be known.

Unit identification is simple. A unique number is simply hard-wired into each unit or is entered via a BCD thumbwheel switch. When data are recorded on a cassette tape or memory that is included in each unit, the identification number is recorded in the header of each data record.

Normally a land surveyor stakes out the precise locations that the central station and the remote recording units are to occupy. Each location is identified according to some code that is related to the geographic coordinates of the location. Customarily, field attendants manually write a comparative table of unit identification versus location code. Later, after the recorded data have been collected from the remote sensors and processed, the processed data can be related to specific surveyed locations on the earth's surface.

Where many hundreds of remote sensors are involved at each setup, manual documentation becomes a formidable task indeed. Therefore the opportunity for gross tabulation errors is unacceptably high.

It is an object of this invention to automatically acquire and record electromagnetic position measurement signals from which can be determined the approximate location of each of a plurality of remote seismic recording units with respect to a central station. It is not intended that the location information calculated by this invention be a substitute for precise land surveying. It is intended that the accuracy of the method will be just sufficient to associate each uniquely identified remote seismic recording unit with that particular presurveyed location at which the unit is positioned.

SUMMARY OF THE INVENTION

In accordance with a preferred embodiment of this invention, I provide a central station and a plurality of remote seismic data recording units deployed within a selected region and spaced apart according to a desired grid spacing. An array of one or more seismic sensors is coupled to each unit.

The central station includes a master clock and means for firing a sound source at selected timed intervals according to the master clock. Included also is a substantially complete means for receiving and recording electromagnetic signal transmissions that have positioning data embedded therein.

Each of the remote seismic data recording units includes a local clock. At selected timed intervals according to the local clocks, the remote recording units are alerted to receive and record seismic signals when the sound source is fired at corresponding intervals. Each remote recording unit also includes an incomplete recording means for utilizing only a portion of the electromagnetic transmissions containing positioning parameters. The electromagnetic signal transmissions are recorded when they are available, as when a navigation satellite is over the horizon, or concurrently with recordation of one or a few seismic data as when navigation signals are continuously available. Preferably both seismic and navigation data are recorded on the same physical storage medium.

In accordance with an aspect of this invention, the central station is preprogrammed to receive and record electromagnetic transmissions at prescribed intervals according to the master clock. The remote recording units are also preprogrammed to receive and record a portion of the same electromagnetic transmissions at corresponding prescribed intervals according to the respective local clock.

In accordance with another aspect of this invention, the electromagnetic transmissions are derived from an earth-orbiting satellite. The central station includes means for receiving and recording dual-frequency Doppler counts and satellite ephemerides. The remote recording units include incomplete recording means for receiving and recording only single-frequency Doppler counts. Post processing means are provided for calculating the position of the central station from the recorded Doppler counts and satellite ephemerides. The Doppler counts as recorded at each remote recording unit are combined with the ephemerides as recorded at the central station to provide the units' differential locations relative to the central station.

In accordance with yet another aspect of this invention, positional parameters for the central station and the remote recording units are derived from transmissions from a constellation of satellites at desired intervals.

In accordance with a further aspect of this invention, differential locations between the central station and the remote seismic data recording units are derived from transmissions emanating from fixed-location transmitters, the transmissions having lane widths greater than but comparable to the grid spacing within an order of magnitude.

BRIEF DESCRIPTION OF THE DRAWINGS

A better understanding of my invention may be gained from the following detailed description and the drawings wherein:

FIG. 1 illustrates in plan view a portion of a typical field layout;

FIG. 2 is a cross section of the earth along line 2—2';

FIG. 4 illustrates an alternate embodiment for use with GPS satellites.

DETAILED DESCRIPTION OF A PREFERRED EMBODIMENT

Figure 3:
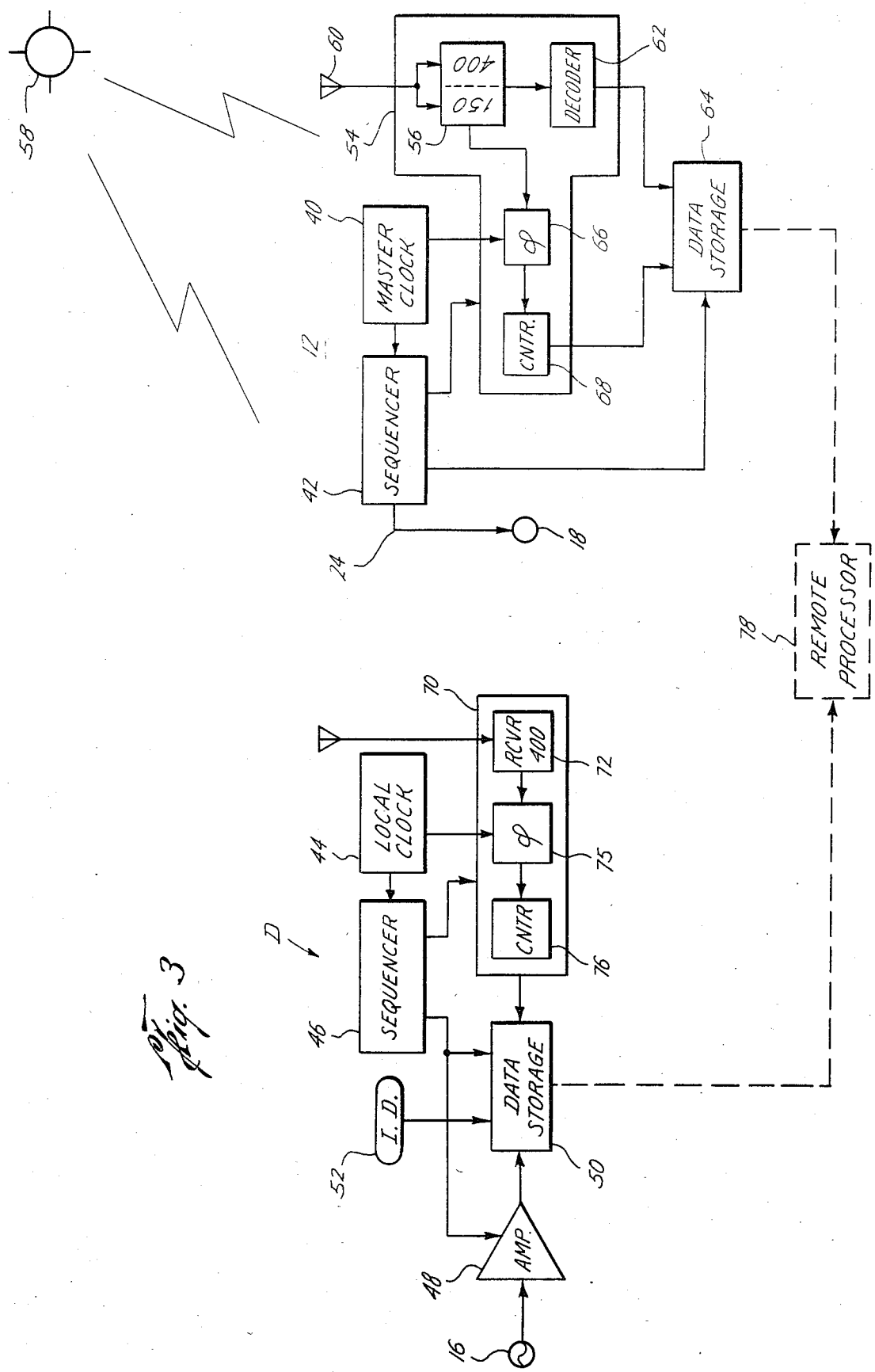
FIG. 3 depicts simplified block diagrams of the essential components contained within a typical remote recording unit and a central station for a first type of navigation system.

Referring now to FIG. 1, there is shown a plan view of a seismic survey grid 10. The grid consists of a central station 12 and a plurality of remote seismic data recording units A-F, located in a two-dimensional areal disposition. An array of one or more seismic sensors such as 14 and 16 are coupled to each remote recording unit to provide seismic data resulting from actuation of a seismic source 18. The closest remote recording unit D is separated from central station 12 by a differential distance Δ. The individual remote recording units may be separated from each other by a distance δ along a regular grid. Any of a large variety of other geometric patterns is, of course, possible. Six remote recording units are shown but several hundred may be deployed in practice over a region within three to five kilometers of the central station. The remote recording units are incapable of communicating with the central station. The desired locations for the central station and the remote recording units are established in the field by a land surveryor.

Referring to FIG. 2 there is shown a section of the earth along line 2—2'. Central station 12, remote recording units C and D and seismic sensors 14 and 16 are emplaced upon the surface 20 of the earth. A source 18 of seismic waves, such as a small explosive charge, is lowered beneath the surface in a shot hole 22. Central station 12 includes a master clock to be described below. At selected timed intervals according to the master clock, the source is electrically fired over wires 24. The resulting seismic waves 26, 28 are reflected from an earth layer 30 and impinge on seismic sensors 14 and 16.

Each remote recording unit includes a local clock as discussed below. At the selected timed intervals, the remote recording units are awakened to receive the reflected seismic signals due to firing of source 18. The received seismic signals are recorded on a removable storage medium that is contained within each remote recording unit. After the remote recording units have received and recorded a block of seismic signals they are deactivated until the next firing time. The central station and the remote recording units are located at stations that the land surveyor had previously marked by flags such as 32, 34, 36.

FIG. 3 shows simplified block circuit diagrams of a typical remote seismic data recording unit D, and the central station 12.

Central station 12 includes a master clock 40 and a sequencer 42. Insofar as simple seismic recording is concerned, at selected timed intervals according to master clock 40, sequencer 42 fires source 18 as above described. The time spacing between intervals depends upon the type of source. If a small explosive charge is used, the time interval is measured in minutes because after each shot, the shot hole 22 must be reloaded. If a surface-supported vibrator is used the time interval may be 15 to 30 seconds.

Again, considering only the seismic data recording function for the moment, each remote recording unit includes a local clock 44 and a sequencer 46. In between firings of the seismic source 18, the remote recording units are shut down to conserve battery power. (It should be mentioned in passing, that conventional well-known power supplies are not shown in the drawings to avoid unnecessary detail.) At selected time intervals according to the local clocks which correspond to the source-firing intervals, sequencer 46 alerts the remote recording units such as D to turn on amplifier 48 and data-recording storage medium 50 in preparation for receiving and recording seismic signals as previously described. At the end of the seismic data recording cycle, the remote recording units are deactivated until the next shot is due.

By way of definition, a recording cycle is the time required to record seismic signals due to a firing of source 18, usually about 6 to 8 seconds. A recording interval is the length of time between successive firings of source 18. A recording period may be equated with a full day's field work.

Data-recording storage media 50 and 64 may be removable cassette tapes or compact removable memories. At the beginning of a recording period, fresh storage media are loaded into the central station and the remote recording units. At the end of a recording period, the storage media are harvested from the units and are removed to a data reduction center where the recorded seismic data are processed. For further details of the system, see U.S. Pat. No. 4,281,403.

Each remote recording unit is assigned a unique identification code or I.D., either by means of a BCD thumbwheel switch such as 52 or by a hard wired code. The I.D. is recorded in the header of each seismic data recording.

It now remains to automatically associate the remote recording unit I.D. with a particular presurveyed location such as 34. To this end, I prefer to use a simplified version of one of the many electronic positioning systems such as LORAN A or C, the Naval Navigation Satellite System also known as TRANSIT, OMEGA, LORAC or the like. At programmed intervals, electromagnetic positional parameters transmitted from a selected positioning system are utilized such as by recording in the data recording storage media such as 50 and 64 of a remote recording unit such as D and the central station 12 respectively, concurrently with the appearance of a satellite over the horizon or for systems for which navigation signals are available continuously, with recordation of reflected seismic signals.

The type of transmission-receiving apparatus depends of course upon the type of positioning system to be used. The principal prerequisite is that the equipment be light and compact, particularly for the remote recording units which are preferably hand-portable. The physical size requirements are less stringent for the central station because it is usually vehicle-mounted.

It is anticipated that the central station equipment will be substantially complete and be capable of recording sufficient positioning data so that an absolute location can be determined independently of any other information. The remote recording units are designed to record a minimum amount of positioning data—just enough to determine the differential position between the central station and the unit in question. Therefore, in the interest of a high degree of portability, the positioning equipment may be incomplete with respect to the central-station equipment. The absolute accuracy of the differential position need not be excessively high. The accuracy need only be better than about half the grid spacing between the remote recording units. If the spacing is 200 feet, then a differential location accuracy better than 100 feet is sufficient to associate a unit in question with a particular presurveyed location.

By way of example but not by way of limitation, consider use of the TRANSIT satellite positioning system. As is well known, a number of navigation satellites orbit the earth in polar orbits. Every two minutes on the even minute mark, the satellite transmits a message containing satellite ephemerides over two very stable carrier frequencies of 150 MHz and 400 MHz. A ground station receiver includes a two-channel receiver to receive the two carrier frequencies and a phase-lock tracker to lock on the satellite transmission during a satellite pass. A local oscillator associated with the receiver provides a reference frequency standard. As the satellite passes by the ground station, the carrier frequencies are Doppler-shifted due to the satellite motion. The carrier frequencies are compared with the reference frequencies to determine a difference frequency in terms of Doppler counts. Typically, over a two-minute transmission, the cumulative Doppler count will vary continuously from about 22,000 to about 50,000, centered around a 32,000-count offset frequency. The changing Doppler count reflects the change in slant range between the satellite and the ground station.

The dual frequencies are used to compensate for ionospheric disturbances which affect the absolute accuracy of the resulting position fix. During the course of a satellite pass, six to eight sets of two minute Doppler counts may be recorded. In current practice, a plurality of short Doppler counts over 4.6-second periods are obtained. Each set of five short Doppler counts is averaged to obtain a 23-second count, thus providing about five independent 23-second counts within each 2-minute transmission.

Known available satellite receivers customarily include a small computer. Following acquisition of the satellite ephemerides and Doppler counts, a position fix is automatically calculated. However for my application, the computer may be eliminated.

A complete commercial satellite-fix receiver system is complex, somewhat bulky by comparison with the remote recording units and rather expensive. For purposes of my invention, I prefer to provide a much simplified set of equipment that is conveniently hand portable, particularly insofar as the remote recording units are concerned.

Referring again to FIG. 3, there is shown a satellite-transmission receiving module 54 at central station 12. Module 54 includes a dual frequency receiver 56 to receive the 150 MHz and 400 MHz transmissions from a satellite such as 58 via antenna 60. The phase-encoded satellite message containing the satellite ephemerides is decoded in decoder 62 and is stored in storage 64. The carrier signals are directed to phase comparator 66 where the carrier signals are compared with a reference signal derived from the master clock 40. The Doppler counts developed by the comparison are accumulated by counter 68. At the end of the satellite pass, the counts are transferred to data-recording storage 64.

Thus, positional parameters derived from dual-frequency carrier and ephemeride transmissions, that is, the Doppler counts and the decoded ephemerides are recorded in storage 64.

Sequencer 42 is preprogrammed to anticipate the rise times of available satellites during any given recording period. When a satellite pass is imminent, sequencer 42 turns on module 54; upon completion of the pass and after the received data have been stored in data recording storage 64, module 54 is turned off.

At the central station 12, a certain economy of equipment is achieved by using the master clock as a reference oscillator as well for sequencing seismic shots.

Turning now to a remote recording unit such as unit D, I provide a satellite receiver module 70. Module 70 is particularly simple and includes a single-channel receiver 72 with a suitable antenna 74. Either 150 MHz or 400 MHz transmissions may be used; for purposes of illustration, the latter frequency is shown. The carrier signal is compared with a reference signal derived from the local clock in phase comparator 75 to develop Doppler counts which are accumulated in counter 76. At the end of the satellite pass, the Doppler count for the 400 MHz transmission, that is, the positional parameters are stored in data recording storage 50 as a separate file along with the normal seismic data files that are also stored therein. As with the central station master clock, the local clocks in the remote recording units are used as reference oscillators as well as sequencers.

Sequencer 46 is of course, programmed to turn on receiver module 70 in expectation of the same impending satellite passes as is sequencer 42 in the central station. It should be understood that seismic data acquisition may progress concurrently with reception and recording of electromagnetic positional data transmissions since sequencers 42 and 46 are in control of both functions.

At the end of a recording period, recording storages 50 and 64 may be removed from the respective remote recording units and the central station, as shown by the dashed lines, to a remote processor 78 such as may be found in a data reduction center. The full complement of satellite data that was recorded at the central station is reduced to define an accurate position fix for the central station which should agree closely with the coordinates of the presurveyed location. Thereafter, the single-frequency Doppler counts recorded at each of the remote recording units are combined with the satellite positional data recorded at the central station. The location computed from the combined recorded data represents the differential location of a remote recording unit with respect to the central station.

In field operation, the remote recording units are emplaced within three to five kilometers of the central station. Tropospheric and ionospheric disturbances can be expected to influence the satellite transmissions to all of the receivers similarly because the effect of such disturbances will normally not vary significantly over distances of a few kilometers. Therefore, even though only single frequency Doppler counts are recorded at the remote recording units, the relative error in the differential location is minimal.

Use of a single recording-storage medium for both positional data signals and seismic data signals is preferred. However it is within the scope of this invention that separate removable storage media could be used, although at the expense of greater bulk and complexity.

Alternatively, solid state memories such as so called bubble memories may be used to record positional signals and seismic data. Such memories may be read and later purged after each recording period and the readout data recorded on magnetic tape or the like.

This invention has so far been described in terms of the TRANSIT satellite positioning system wherein a position fix is derived from data received during a single satellite pass. Because of the limited number of such satellites and because the satellites are in polar orbits, a position fix is available on an average of only once every one to three hours. Currently under development and now partially operational is the Global Positioning System (GPS), also dubbed NAVSTAR. The GPS is configured such that a constellation of at least four satellites is always visible anywhere on or near the surface of the earth. The complete satellite constellation consists of three orbital planes that contain six satellites each, in circular orbits with a period of 12 hours. The satellites transmit over two carrier frequenies at 1575 and 1227 MHz. The so-called Coarse Acquisition (C/A) satellite data are quadraphase modulated on the 1575 MHz carrier frequency. A second P (precision) signal is biphase modulated on both carriers and is unique to each satellite and the respective signals are mutually orthogonal (uncorrelated).

Positioning may be accomplished in several different modes including pseudoranging, range differential, interferometric and range rate measurements from Doppler shift. In the preferred Doppler mode, the Doppler shifts measured with respect to at least three satellites, yield a high-precision position accurate within ten meters or less.

FIG. 4 represents an alternate configuration of the "front end" of receiving modules 54 and 70 suitable for use with the GPS. At the central station 12, receiving module 54 includes a dual-frequency receiver 56' tuned to 1575 and 1227 MHz. As with TRANSIT, the two frequencies are needed to correct for first order ionospheric disturbances. Since at least four satellites are always visible at the same time, a satellite selector or multiplexer 57 selects each one of the satellites in sequence for receiving the respective Doppler shifted carrier frequencies. An acquisition time of at least six seconds per satellite is required to receive a complete set of satellite ephemerides. Decoder 62 decodes the satellite message as before (FIG. 3) for storage in data storage 64. The output from satellite selector 57 is transmitted to phase comparator 66 (FIG. 3) where the Doppler count is generated. Because a swarm of GPS satellites is always visible, sequencer 42 need not be programmed to respond to the rise time of any particular satellite as for TRANSIT. It may be programmed to obtain positioning data at any desired interval during a recording period such as once per hour.

The front end of receiving module 70 of a remote recording unit D is modified to include a 1575 MHz receiver 72' and a satellite selector 73. As with the central station, Doppler counts are developed from the carrier transmissions of each of the same satellites that are selected by satellite selector 57; the counts are stored in data storage 50. The differential positions of the remote recording units are determined by combining the recorded single-frequency Doppler counts with the dual-frequency data recorded at central station 12 as previously described.

Position identification is not necessarily limited to use of satellites. Use of such fixed-location land-based positioning systems as LORAN C and LORAC fall within the scope of this disclosure. The choice of a particular fixed-location system is determined by its availability in a given area and upon the width of a lane (that is, the unit time delays for an hyperbolic system) of the signals that emanate from the transmitters of that system, with respect to the grid spacing of the remote recording units and the central station.

In implementing such a system, receiving modules 54 and 70, FIG. 3, would include only a medium frequency receiver and means for determining the transmission time delays between two pairs of transmitters (not shown) as is well known to the art. The central station 12 would normally be carefully set up at a known location having a known lane count. The lane width associated with the ground-based positioning system is required to be greater than the largest grid spacing between remote recording units and the distance between central station 12 and the nearest remote recording unit such as D.

Intermittantly throughout a recording period, sequencers 42 and 46, FIG. 3, causes receiver modules 54 and 70 to receive and record transmissions from the land-based positioning system. The recorded data, when reduced, represents fractional-lane measurements. The actual positions of the respective remote recording units are determined by combining the recorded remote recording unit signals with signals recorded at the central station by progressively accumulating the recorded fractional lane counts as one moves outwardly from the central station as a focal point. It is evident from this discussion, that a very high frequency azimuthal positioning system having a lane width of 50 feet would be unsuitable for use with a system having a 200-foot grid spacing since it would not be possible to maintain lane-count continuity. Conversely, except for use with very widely-spaced remote recording units, the OMEGA system with its 8-mile lanes would be far too coarse.

A suitable system therefore should have lane widths that are comparable to, but greater than, the grid spacing within an order of magnitude. A second requirement is that the system be passive. An active system requires interrogation and response modules. Such systems become too cumbersome and too greedy of battery power for use with portable remote recording units.

I claim as my invention:

1. In a seismic data recording system including a central station, a plurality of remote seismic data recording units designed for deployment within a desired region relative to the central station and spaced apart according to a desired grid spacing, means within each remote seismic data recording unit for recording at least one channel of seismic data, means for synchronizing seismic data recording cycles of the remote seismic data recording units with seismic signals produced under control of the central station, the improvement comprising:

means in the central station for receiving and recording electromagnetic positioning signals originating from means external to and independent of said seismic data recording system;

means in each said remote seismic data recording unit for receiving and utilizing only a portion of said electromagnetic positioning signals simultaneously with concurrent recording of said electromagnetic positioning signals in said central station; and means for combining the electromagnetic positioning signal portions utilized by said remote seismic data recording units with the electromagnetic positioning signals recorded in said central station thereby to derive a differential position relative to said central station.

2. The improved seismic data recording system as defined in claim 1, including:
means in each said remote seismic data recording unit for receiving and recording seismic signals together with reception and utilization of said electromagnetic positioning signal portion.

3. The improved seismic data recording system as defined in claim 2, including:
data signal storage means in each said remote seismic data recording unit for recording both seismic data signals and electromagnetic positioning signals.

4. The improved seismic data recording system as defined in claims 1 or 2, including:
means in said central station for receiving electromagnetic positioning signals from an earth-orbiting satellite and for recording positional parameters derived from dual-frequency carrier and ephemeride transmissions; and
means in each said remote seismic data recording unit for receiving electromagnetic positioning signals from said satellite and for recording positional parameters derived from that portion of the electromagnetic positioning signals that includes only single frequency carrier transmissions.

5. The improved seismic data recording system as defined in claims 1 or 2, including:
means in said central station for receiving electromagnetic positioning signals from a constellation of earth-orbiting satellites at desired intervals and for recording positional parameters derived from dual-frequency carrier and ephemeride transmissions; and
means in each said remote seismic data recording unit for receiving electromagnetic positioning signals from said constellation of earth-orbiting satellites at said desired intervals and for recording positional parameters derived from that portion of the electromagnetic positioning signals that includes only single frequency carrier transmissions.

6. The improved seismic data recording system as defined by claims 1 or 2 wherein said electromagnetic positioning signals emanate from fixed-location transmitters and the lane width of said electromagnetic positioning signals is comparable to but greater than the grid spacing within an order of magnitude.

7. In a seismic data recording system including a central station and a plurality of remote seismic data recording units designed for deployment at desired grid spacings within a selected region with respect to said central station, each said remote seismic data recording unit having means for recording at least one channel of seismic data, means for synchronizing seismic data recording cycles of the remote seismic data recording units with seismic signals generated under control of said central station, an improved method for determining the differential positions of said remote seismic data recording units relative to said central station, comprising the steps of:
receiving and recording electromagnetic positioning signals at said central station originating from means external to and independent of said seismic data recording system;
receiving and utilizing only a portion of said electromagnetic positioning signals at each said remote seismic data recording unit simultaneously with concurrent reception and recordation of said electromagnetic positioning signals at said central station; and
combining the electromagnetic positioning signal portions received by said remote seismic data recording units with the concurrently-received electromagnetic positioning signals recorded at said central station.

8. The method of differential positioning as defined in claim 7, including the further steps of:
recording seismic data signals at each said remote seismic data recording unit together with reception and recordation of said electromagnetic positioning-signals portions.

9. The method of differential positioning as defined by claims 7 or 8, including the steps of:
receiving and recording at said central station positional parameters derived from electromagnetic positioning signals transmitted from an earth-orbiting satellite including dual-frequency carrier and satellite ephemeride transmissions; and
receiving and recording at each said remote seismic data recording unit selected positional parameters derived from that portion of the electromagnetic positioning signals that includes only single frequency carrier transmissions.

10. The method of differential positioning as defined by claims 7 or 8, including the steps of:
receiving and recording in said central station at desired intervals positional parameters derived from electromagnetic positioning signals transmitted from a constellation of earth-orbiting satellites including dual frequency carrier and satellite ephemeride transmissions; and
receiving and recording in each said remote seismic data recording unit at said desired intervals, selected positional parameters derived from that portion of the electromagnetic positioning signals that includes only single frequency carrier transmissions.

* * * * *